United States Patent [19]

Schertz

[11] 4,099,515
[45] Jul. 11, 1978

[54] FABRICATION OF TROUGH-SHAPED SOLAR COLLECTORS

[75] Inventor: William W. Schertz, Batavia, Ill.

[73] Assignee: The United States of America as represented by the United States Department of Energy, Washington, D.C.

[21] Appl. No.: 811,347

[22] Filed: Jun. 29, 1977

[51] Int. Cl.² .............................................. F24J 3/02
[52] U.S. Cl. ................................. 126/271; 126/270; 136/89 PC
[58] Field of Search ......................... 126/270, 271; 136/89 PC

[56] References Cited

U.S. PATENT DOCUMENTS

| 3,957,031 | 5/1976 | Winston | 126/270 |
| 4,002,499 | 1/1977 | Winston | 126/271 |
| 4,007,729 | 2/1977 | Chao | 126/270 |
| 4,030,477 | 6/1977 | Smith | 126/270 |
| 4,055,161 | 10/1977 | Jones | 126/271 |

Primary Examiner—Leland A. Sebastian
Attorney, Agent, or Firm—Dean E. Carlson; Frank H. Jackson; Paul A. Gottlieb

[57] ABSTRACT

There is provided a radiant energy concentration and collection device formed of a one-piece thin-walled plastic substrate including a plurality of nonimaging troughs with certain metallized surfaces of the substrate serving as reflective side walls for each trough. The one-piece plastic substrate is provided with a seating surface at the bottom of each trough which conforms to the shape of an energy receiver to be seated therein.

16 Claims, 9 Drawing Figures

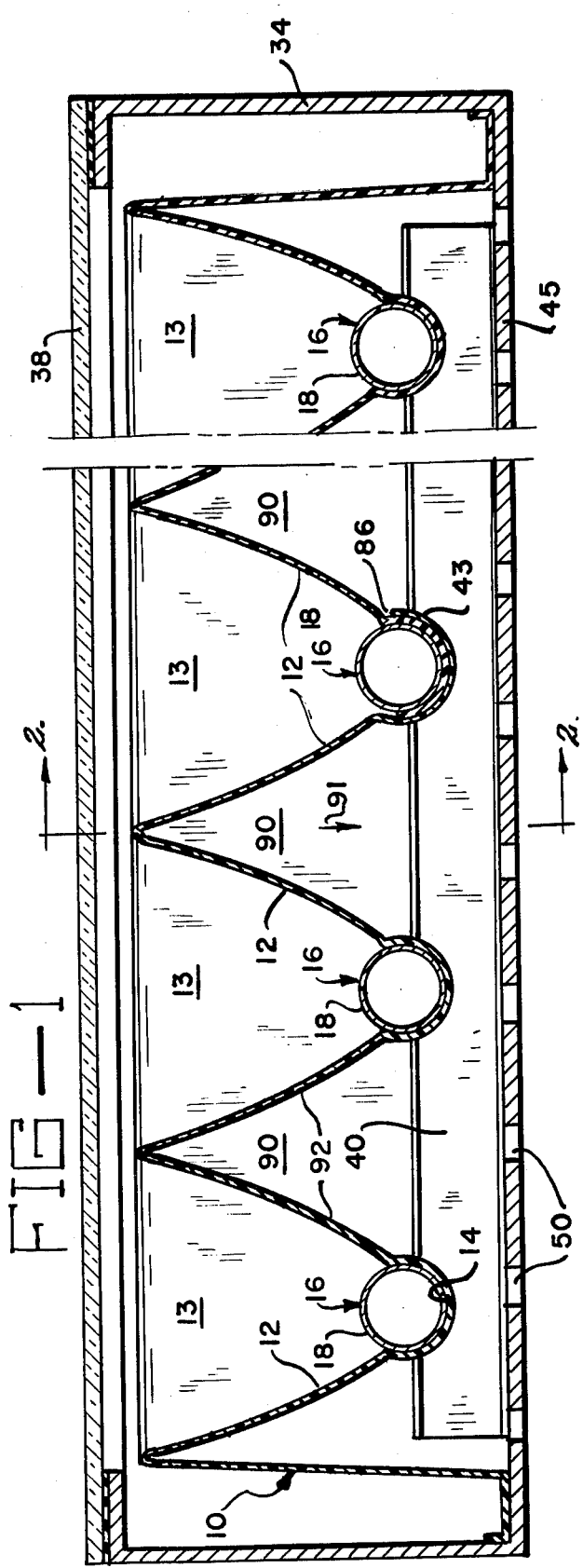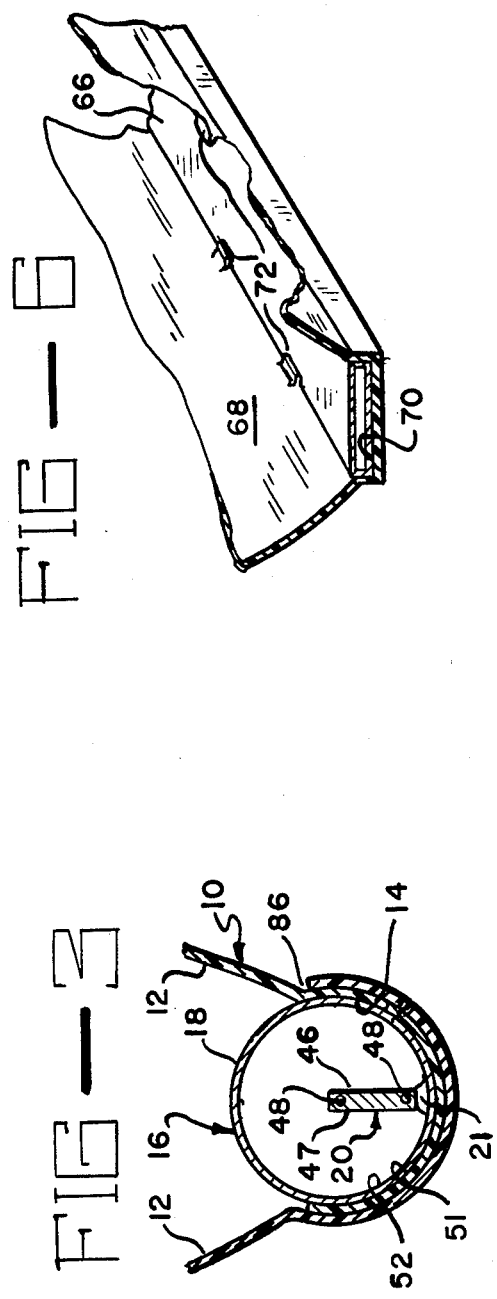

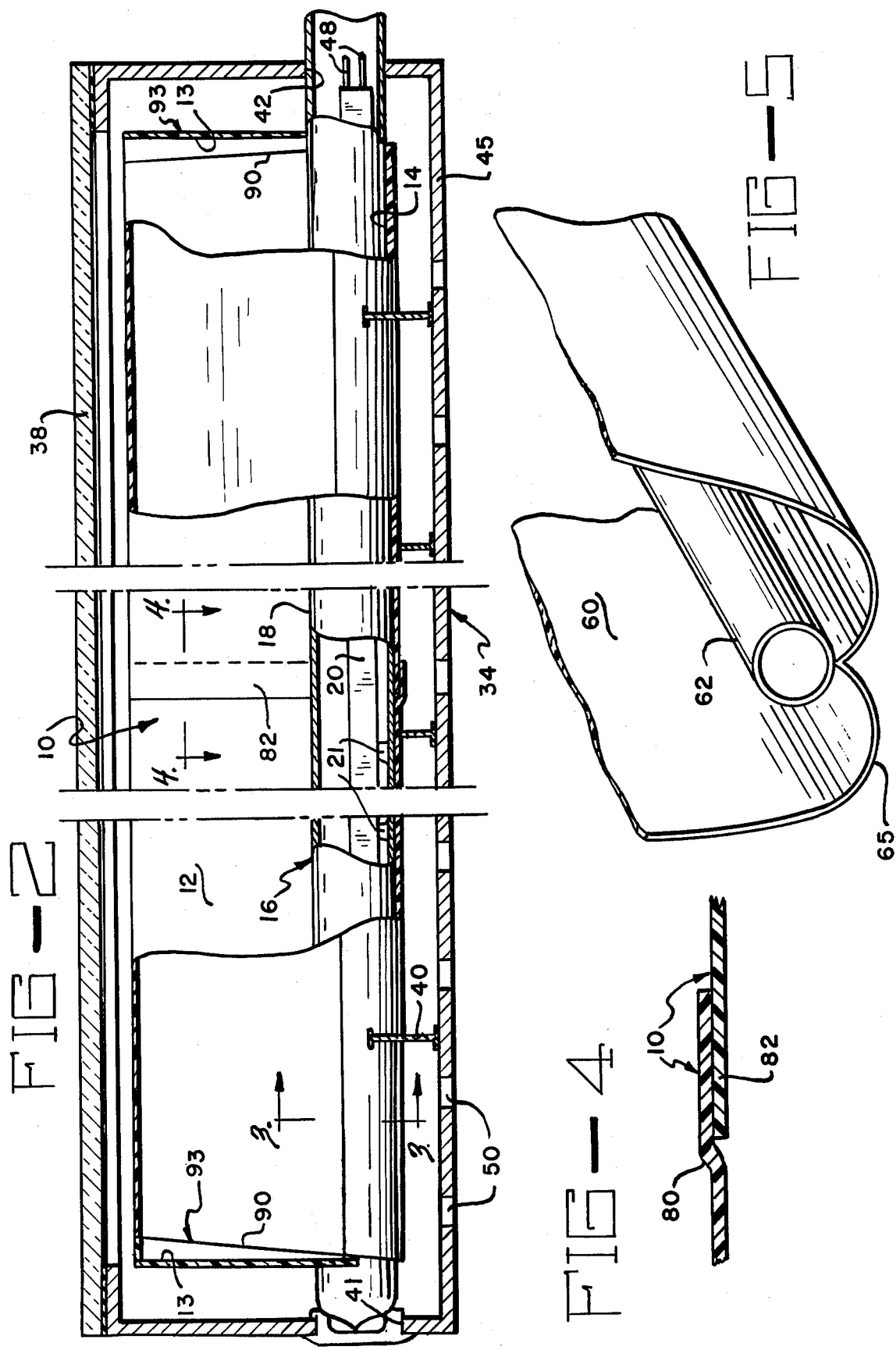

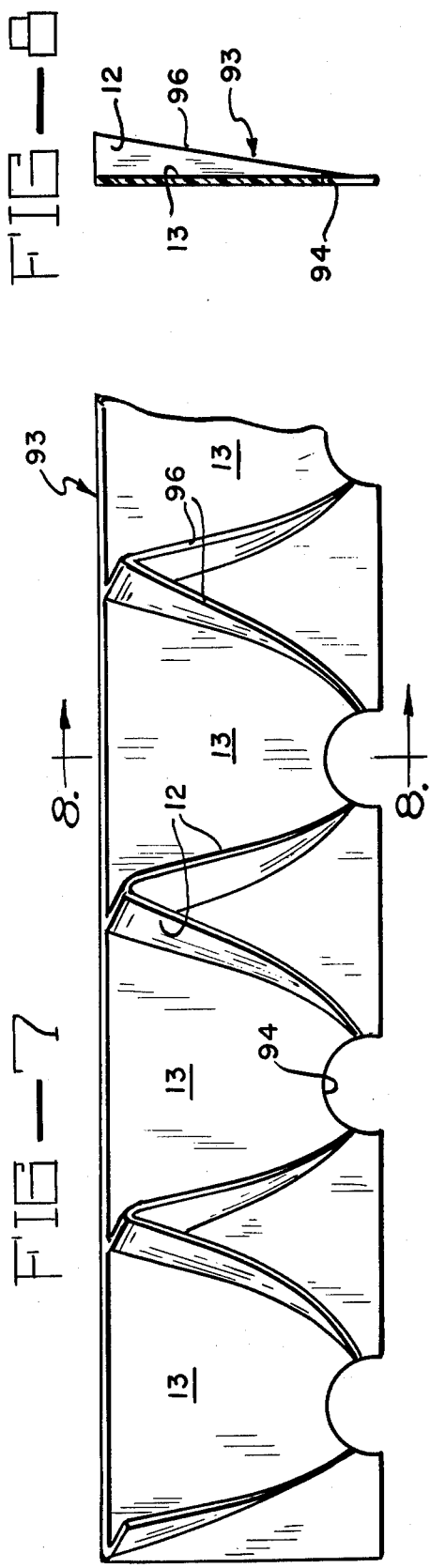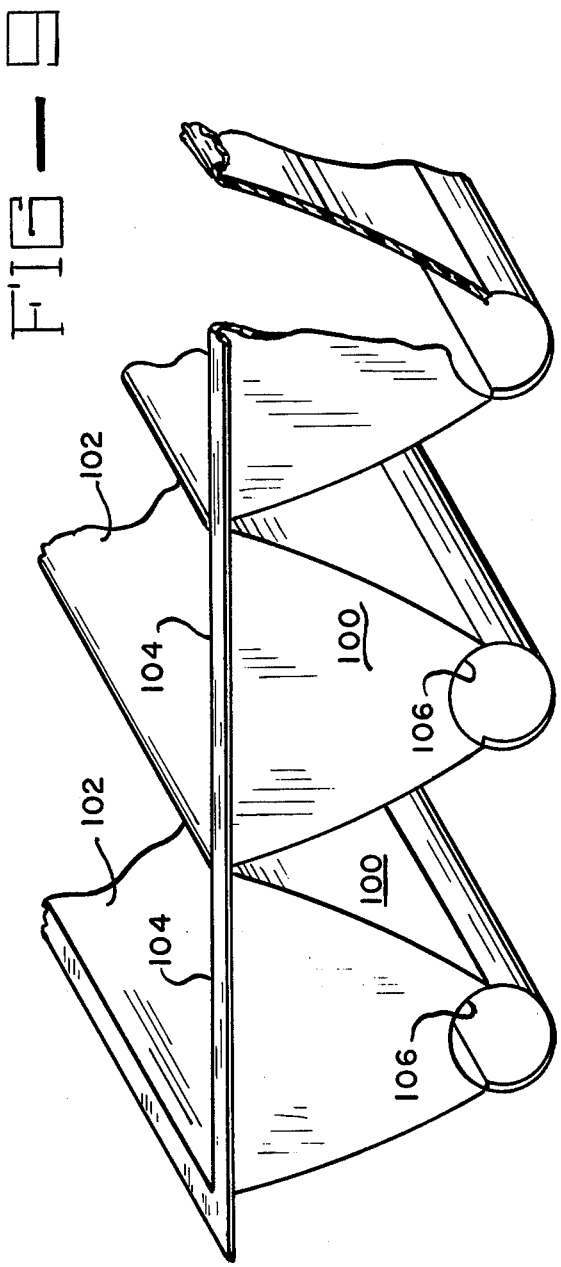

FABRICATION OF TROUGH-SHAPED SOLAR COLLECTORS

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

In U.S. Letters Patent Nos. 3,923,381, 3,957,031 and 4,002,499, there are given examples of a particular type of radiant energy concentration and collection device generally known as a trough-shaped nonimaging collector. Such concentration devices take radiant energy which strikes an entrance aperture and concentrates it onto an exit surface of smaller area than the entrance aperture. Reflective side walls of particular contour extend between the entrance aperture and the exit surface. There is generally positioned at the exit surface an energy absorber.

Prior art methods of constructing a trough-shaped collector include use of extruded aluminum side walls, aluminum sheet rolled into the proper contour or metallizing of thick solid plastic substrates. All these methods are characterized either by their high cost of manufacture or large weight. The cost arises from the materials used and the means required to manufacture the devices. Large weight is detrimental to the commercial potential because of the increased handling and shipping costs. Thin plastic has been suggested as a possible substitute material. However, use of thin plastics has not been possible because of the inability of thin plastics to withstand the high temperature of the absorber and to provide sufficient structural strength for long life and to maintain the precise alignment of the elements of a trough-shaped collector so that energy is efficiently collected.

It is therefore an object of this invention to provide an improved radiant energy concentration and collection assembly.

Another object of this invention is to provide a lightweight, inexpensive trough-shaped solar radiant energy collector utilizing thin-walled plastic.

SUMMARY OF THE INVENTION

A trough-shaped nonimaging radiant energy concentration and collection device is provided. It is comprised of a one-piece thin-walled plastic substrate having wall portions corresponding to the ideal contour desired for such a trough-shaped collector. The wall portions are metallized so as to be reflective. The substrate also is provided with a seating portion at the exit surface between the opposing wall surfaces. The seating portion is adapted to receive an energy absorber of particular shape. Typically the energy absorber is a rigid long device which may be snapped into the seating surface so as to provide structural strength for the substrate. An enclosure may be provided within which the assembly is positioned. Also a cover glass can be provided to provide a sealed assembly.

BRIEF DESCRIPTION OF THE DRAWINGS.

FIG. 1 shows an assembled array of trough-shaped radiant energy concentration and collection devices formed of thin-walled plastic, FIG. 2 shows a cross section along line 2—2 of FIG. 1, FIG. 3 shows a partial section along line 3—3 of FIG. 2, FIG. 4 shows a partial section along line 4—4 of FIG. 2, FIG. 5 shows an alternate embodiment for a circular energy receiver with reflective walls which meet in a cusp, FIG. 6 shows an alternate embodiment for a flat receiver, FIG. 7 shows a plastic piece providing end walls for each trough of FIG. 1, FIG. 8 shows a section through line 8—8 of FIG. 7, and FIG. 9 shows an alternate embodiment for the one-piece plastic substrate.

DETAILED DESCRIPTION OF THE INVENTION

Referring to FIG. 1 and FIG. 2, there is shown an assembly forming a radiant energy concentration and collection device. The assembly is of a trough-shaped collection device which is characterized by having two opposing reflective walls which extend between an entrance aperture and an exit surface and which direct all energy incident on the entrance aperture within a given angle of acceptance to the exit surface. There is generally positioned at and conforming in shape to the exit aperture an energy absorber. The assembly herein disclosed includes a one-piece thin-walled plastic substrate 10. The substrate 10, is so configured as to provide surfaces 12 corresponding in contour to the ideal transverse cross section as defined in the patents previously referred to. Of course, any contour for side walls of a trough could be utilized. The contours specified in the above patents are preferred because they provide the highest concentration ratios. End reflective walls 13 may also be provided as will be described. Surface 12 is metallized so that it is reflective. At the exit surface which is the bottom of the trough formed by the surfaces 12 and walls 13, the substrate 10 includes a seating surface 14. Seating surface 14 is shaped to receive an energy absorber 16.

In the embodiment shown in FIG. 1 and FIG. 2, the absorber is in the form of a sealed tube 18 of circular cross section. Within the tube 18 is a flat vertical energy-absorbing device 20. Tube 18 may be evacuated and thereby used to insulate the absorbing device 20 from substrate 10 for hight-temperature operation, or tube 18 may be used only for suppression of convection from absorbing device 20 for low-temperature operation. Contact between device 20 and tube 18 is minimized and device 20 is supported along the length of tube 18 by nubs 21. This limits conduction heat losses. Seating surface 14 in this embodiment has a cross section in the form of a portion of a circle whose diameter is about the same as the outside diameter of tube 18. The arc encompassed by seating surface 14 is larger than a semicircle so that tube 18 can be slipped into the seating surface 14 and be grasped by surface 14. Because of the length of trough-shaped collectors, tube 18 will give structural rigidity to the one-piece plastic substrate as well as protect the plastic from the temperature achieved by absorbing device 20. Each trough of substrate 10 has a tube 18 positioned in the seating surface 14 at the bottom of each trough.

For a complete assembly, the one-piece substrate may be mounted in a containment box 34. Box 34 facilitates mounting of a cover plate 38 over substrate 10 and serves as a structural anchor for substrate 10. Box 34 has a pair of ports 41 and 42 for each tube 18 to be fitted into. The mounting of tubes 18 in each pair of ports will hold down substrate 10 to keep it properly positioned. Box 34 may also be provided with ribs 40. The ribs include cutouts 43 corresponding in shape and location to each substrate seating surface 14. Ribs 40 strengthen and stiffen the box and also support the combination of substrate 10 and tubes 18 at periodic intervals. Since a thin plastic substrate is flexible, ribs 40 also provide a convenient means of correctly maintaining the spacing between adjacent troughs to allow accurate registration of the troughs. Normally, ribs 40 can be formed as part of a one-piece containment box 34 if the box 34 has a floor 45 as shown in FIG. 1 and FIG. 2. With a floor 45 it may be necessary to allow for cooling of the assembly so holes 50 may be provided in floor 45 to allow air to circulate. Of course, no floor need be provided so that the bottom of the assembly would be open.

Referring to FIG. 3, there is shown in detail tube 18 and surface 14. In the embodiment shown, device 20 is a vertical sheet. Absorber device 20 is a device which receives energy directed onto it by walls 12 and 13 of each trough. Device 20 could be a flat plate absorber with a heat transfer fluid circulated through a U-shaped tube 48 running the length of device 20 for removing heat absorbed by the plate. Connections would be made at one port 42 to tube 48 for the circulation of fluid. For such a flat plate absorber, tube 18 would ideally be evacuated to suppress convection losses. Alternatively, a flat device 20 could accommodate photovoltaic cells on either or both sides 46 and 47 of flat device 20. Through the tube 18 could be sent a coolant for maintaining the preferred temperature of such cells. At one port 42 holding each tube would be both electrical connections to the cells and an outlet for the coolant. As described in the '031 and '499 patents, the ideal contour for the trough with a vertical absorbing device 20 includes side walls 12 and a second circular reflective portion which corresponds to the shape of surface 14. This second reflective portion can be provided by metallizing inner surface 51 of surface 14 or metallizing a portion of inner surface 52 of tube 18.

Of course, other types of energy absorbing devices could also be utilized. These include sending a coolant directly through the tube 18 to act as the energy absorbing material. As is described in the '499 patent previously referred to, the ideal contour for such a trough shape may not only include the long side wall surfaces 12 but also a cusp portion. A cusp-shaped, one-piece substrate 60 is shown in FIG. 5. Here there would be no snap action and the absorber 62 would be held only by ports in box 34. Ribs could be adapted to receive the cusp 65. The reflective cusp portion may be placed as a separate piece in the tube 62 or the seating surface 65 may be formed in the ideal shape of the cusp with the bottom metallized as shown in FIG. 5.

A flat absorber shape 66 could be utilized as shown in FIG. 6. Here the one-piece substrate 68 includes a flat seating portion 70. Snap action can be provided by undercutting both sides of seating portion 70 or by providing nubs 72 on either side. The ports in box 34 for the embodiment of FIG. 6 would be shaped to receive the flat absorber.

The one-piece plastic substrate may be formed, for example, by use of vacuum-formed plastics. The substrate shape is formed by thermoforming a plastic sheet over an aluminum mold of the appropriate shape. The result is the one-piece thin plastic substrate 10. Surfaces of the substrate which will correspond to reflective surfaces should be glossy after forming so that they can be made properly reflective. Each thermoformed panel constitutes a module that may be easily integrated to form a larger surface unit. The plastic panels may be designed to allow joining them end to end with a common receiver or they may be combined sideways for several troughs. For extensions in the direction parallel to the troughs, an inset 80 can be provided at one end of each substrate as shown in FIG. 4 and FIG. 2. The adjacent substrate 82 will overlap. For extensions in the direction transverse to each trough, each substrate can begin with a seating surface as at 86 of FIG. 1 and FIG. 3. Seating surfaces can then be cupped together. The ribs and ports will hold these joints together although a cement may also be utilized. In this manner, a large surface unit may be formed under one cover glass.

Box 34 may also be formed of plastic. Again, thermoformed plastic may be used for box 34 and formed in the same manner as the one-piece plastic substrate. Other techniques for forming the box and substrate are injection molding, extrusion of long strips and roto molding. Examples of plastics which may be used for the substrate and box are polyvinyl chloride-acetate copolymer, ABS for thermoforming, and ABS, polysulfone, or polycarbonate for injection molding. The cover plate could be of LEXAN, Acrylic or glass. Cover glass 38 is sealed to box 34 in a conventional manner.

If thermoformed, substrate 10 most likely would be formed with solid portions 90 at the end of each trough. This would arise as the thermoforming process would draw the plastic over a mold in the direction of arrow 91 with the underside 92 of substrate 10 being drawn against a mold of the desired configuration. If made by such a technique, the inclusion of end walls 13 as part of the substrate would be difficult. Therefore, substrate 10 could be made without end walls and a separate end wall piece 93 could be provided. Such an end wall piece is shown in detail in FIG. 8 and FIG. 9. Piece 93 could be formed of a metal sheet or it could also be formed of plastic. The piece 93 includes cutouts 94 so that it may be positioned over tubes 18 and may simply rest thereon. Since substrate 10 will likely include a draft or angle at each end 90 to facilitate removal of the plastic from the mold, end piece 93 should include projections 96 to complete side walls 12. Between opposing projections 96 end piece 93 provides a flat surface forming end walls 13.

It is possible that substrate 10 could be formed with a mold opposite to that just described. Such a substrate 100 is shown in FIG. 9. Here substrate 100 may include end walls 104 in addition to side walls 102. At the end walls, holes 106 are provided to allow for insertion of tubes.

To make surfaces 12 and 13 reflective if they are of plastic, it is necessary to metallize them. Means of doing this include vapor deposition or, with some techniques, forming the reflective wall during forming of the substrate. With injection molding a foil can be placed between the mold and the plastic. Materials which can be used include aluminum and silver.

The embodiments of the invention in which an exclusive property or privilege is claimed are defined as follows:

1. A cylindrical radiant energy concentration and collection device comprising: a plurality of rigid energy absorbers, a one-piece thin-walled plastic substrate having a plurality of pairs of opposing wall portions forming troughs, each wall portion being of predetermined contour and having thereon a material making said wall portion reflective for directing radiant energy incident thereupon, said substrate including a seating surface between each pair of opposing wall portions, each seating surface being adapted to receive one of said absorbers such that radiant energy is directed by said wall portions to said absorber, each of said seating surfaces being of such shape that said seating surface grasps said absorber and fits around said absorber received by said seating surface, said rigid absorbers thereby giving structural strength to said substrate.

2. The device of claim 1 further including a containment box within which said substrate and said absorbers are mounted, said box including one pair of ports associated with each absorber, one port of each of said pairs of ports being adapted to receive one end of said absorber.

3. The device of claim 2 wherein said box further includes at least one rib extending transverse to the longitudinal direction of said troughs and adapted with cutouts, each of said cutouts being so positioned along said rib to receive one of said troughs in the preferred spaced apart relation for said troughs, said rib thereby providing support for said substrate and maintaining the proper spacing for the troughs of said substrate.

4. The device of claim 3 wherein said substrate includes end wall portions at the end of each trough which are reflective.

5. The device of claim 3 further including an end wall piece of such shape as to fit on top said absorbers and providing end wall surfaces corresponding to end walls for each trough, said end wall surfaces being reflective.

6. The device of claim 3 further including a second one-piece thin-walled plastic substrate, said substrates being positioned adjacent each other.

7. The device of claim 6 wherein one end of one of said substrates transverse to the troughs thereof is inset so that the other substrate may be placed in overlapping relation thereto.

8. The device of claim 6 wherein both of said substrates end on a side longitudinal to the troughs thereof along a seating surface so that said substrates can thereby be placed adjacent each other in proper alignment by cupping said ends one within the other.

9. The device of claim 3 wherein said absorbers are tubular and said seating surfaces are circular with circumference slightly larger than a semicircle, said cutouts are also circular to receive said seating surfaces.

10. The device of claim 9 wherein said absorbers are evacuated tubes containing an energy absorbing apparatus, said evacuated absorbers insulating said absorbing apparatus from said plastic substrate.

11. The device of claim 10 wherein said absorbing apparatuses are vertical flat plates.

12. The device of claim 11 wherein said seating surfaces are made reflective.

13. The device of claim 11 wherein the inside surface of each of said tubular absorbers adjacent said seating surface is reflective.

14. The device of claim 11 wherein said flat plate includes means for removing the heat absorbed thereby.

15. The device of claim 3 wherein said absorbers are rectangular and said seating surfaces and said cutouts are half rectangles, said seating surfaces each including at least one projection overlapping said rectangular absorber.

16. The device of claim 3 further including a cover glass coupled to said containment box above said troughs.

* * * * *